United States Patent [19]

Gay et al.

[11] Patent Number: 4,886,875

[45] Date of Patent: Dec. 12, 1989

[54] END-CAPPING OF POLYARYLATE CARBOXYL ACID ENDS BY USE OF AROMATIC CARBONATES

[75] Inventors: Frank P. Gay; Francis M. Logullo, both of Hockessin, Del.; Robert R. Luise, Boothwyn, Pa.; Mark P. Mack, Newark, Del.

[73] Assignee: E. I. Du Pont de Nemours and Company, Wilmington, Del.

[21] Appl. No.: 281,036

[22] Filed: Dec. 7, 1988

[51] Int. Cl.$^4$ ............................................... C08G 63/12
[52] U.S. Cl. .................................... 525/439; 524/409; 524/410
[58] Field of Search .................. 525/439; 524/409, 410

[56] References Cited

U.S. PATENT DOCUMENTS

| | | | |
|---|---|---|---|
| 2,863,854 | 12/1958 | Wilson | 260/75 |
| 3,300,477 | 1/1967 | Thoma et al. | 260/75 |
| 3,657,191 | 4/1972 | Titzmann | 260/75 T |
| 3,752,866 | 8/1973 | Doerr | 260/860 |
| 4,137,221 | 1/1979 | Hara et al. | 528/273 |
| 4,327,207 | 4/1982 | Lazarus | 525/439 |
| 4,348,314 | 9/1982 | Lazarus et al. | 525/439 |
| 4,374,960 | 2/1983 | Rothwell et al. | 525/436 |
| 4,436,894 | 8/1984 | Urasaki et al. | 528/176 |
| 4,462,947 | 7/1984 | Huggard | 264/54 |
| 4,533,702 | 8/1985 | Freitag et al. | 525/439 |
| 4,680,372 | 7/1987 | Rosenfeld | 528/179 |

FOREIGN PATENT DOCUMENTS 56-152862  4/1980  Japan.
58-203111A 11/1983 Japan.

*Primary Examiner*—Harold D. Anderson
*Assistant Examiner*—T. Mosley

[57] ABSTRACT

A process for improving the stability of a polyarylate resin by reducing the terminal carboxyl acid group concentration of the polyarylate resin, the process being comprised of melting a mixture of the polyarylate resin and an aromatic carbonate capping agent and reacting the mixture under heat and, if necessary, vacuum until the concentration of the terminal carboxyl acid groups is reduced to less than that of the polyarylate resin prior to end-capping. The process also results in a polyarylate resin with a decreased flammability rating when the aromatic carbonate capping agent is bromine substituted.

23 Claims, No Drawings

END-CAPPING OF POLYARYLATE CARBOXYL ACID ENDS BY USE OF AROMATIC CARBONATES

BACKGROUND

1. Technical Field

This invention relates to the process for preparing stabilized wholly aromatic polyester, also termed polyarylate, compositions. More specifically, this invention relates to a method for producing a stable, particularly hydrolytically stable, high molecular weight, wholly aromatic polyester, hereinafter referred to as polyarylate, by reacting a polyarylate resin that melts or flows below about 475° C., preferably below 375° C. in the melt, with an aromatic carbonate capping agent thereby reducing the terminal carboxyl acid group content in the polyarylate resin. The term aromatic carbonate includes diaryl carbonates, unsubstituted polyarylcarbonate oligomers and polymers, and substituted polyarylcarbonate oligomers and polymers.

Polyesters are produced from polycarboxylic acids and polyhydric alcohols. When both the polycarboxylic acid and the polyhydric alcohol are aromatic in nature, the resultant polyester is wholly aromatic and is referred to as a polyarylate. In the case of either polyarylates or aliphatic polyesters, there often remains, after reaction between the polycarboxylic acid and the polyhydric alcohol, some free carboxylic acid groups on the ends of the polyarylates or the aliphatic polyesters. This is particularly true when the polyarylates are synthesized via a melt polymerization method.

It is well known in the trade that free carboxyl acid end groups are detrimental to the stability of a polyarylate. For example, hydrolytic stability, high temperature stability, and stability during reprocessing, recycling, and reclaiming procedures all decrease as the terminal carboxyl acid group content of the polyarylate increases. As such, when the terminal carboxyl acid group concentration in the polyarylate is decreased, the stability of the polyarylate will be increased. In the present invention, there is developed a novel process for reducing the terminal carboxyl acid group content on a polyarylate. This process involves reacting a polyarylate, in the melt, with an aromatic carbonate, particularly a diaryl carbonate, an unsubstituted polyarylcarbonate polymer or oligomer, or a substituted polyarylcarbonate polymer or oligomer. The aromatic carbonates act as end-capping agents for the terminal carboxyl acid groups on the polyarylate, thereby resulting in a polyarylate having a reduced concentration of carboxyl acid end groups. When the aromatic carbonate is a brominated polyarylcarbonate oligomer, not only is the terminal carboxyl acid group concentration for the polyarylate decreased but also the flame resistance of the polyarylate is increased. The end-capped polyarylates of the present invention, as produced by the process of the present invention, are useful wherever there is needed a polyarylate with reduced terminal carboxyl acid group concentration having improved stability, particularly improved hydrolytic stability or improved stability upon subsequent reprocessing, reclaiming, and recycling. The polyarylates end-capped by the process of the present invention are useful in wire and cable applications and other engineering applications.

2. Description of Related Art

Much research has been directed towards developing a means by which to end cap the residual carboxyl acid end groups of polyesters. This research is disclosed in the patents or publications described below.

U.S. Pat. No. 2,863,854, granted Dec. 9, 1958 to Wilson, discloses a method of lowering the acid numbers of polyester materials, said polyester materials being made from dibasic acids and aliphatic polyhydroxy compounds, by reaction with alkylene carbonates. U.S. Pat. No. 3,300,447, granted Jan. 24, 1967 to Thoma, discloses a process for reducing the acid number of polyesters made from polycarboxylic acid and aliphatic polyhydric alcohol by reaction with a compound which contains at least two groups having the formula

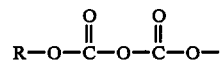

where R is a lower alkyl radical. While all of the above references disclose some method to reduce the number of terminal acid groups on the polyester, none disclose the particulars of the present invention with regard to the capping of aromatic polyesters in the melt by use of aromatic carbonates.

U.S. Pat. No. 3,752,866, granted Aug. 14, 1973 to Doerr, discloses a process which provides for the late addition of a polycarbonate to a fiber forming polyester melt, said polyester being made from diacids and aliphatic diols, which results in a polyester having a lower level of carboxyl end groups. There is no mention of wholly aromatic polyesters.

U.S. Pat. No. 4,327,207, granted Apr. 27, 1982, to Lazarus, discloses high molecular weight linear condensation polyesters stabilized against deterioration by reaction with alkylene carbonates in the presence of a catalytic amount of sodium iodide or potassium iodide. U.S. Pat. No. 4,348,314, granted Sept. 7, 1982, to Lazarus, discloses the same as the preceding patent except that the catalyst is selected from the group consisting of sodium thiocyanate and potassium thiocyanate. Neither reference discloses a method for end-capping polyarylates, nor is there disclosure of aromatic carbonates as end-capping agents.

U.S. Pat. No. 4,462,947, granted July 31, 1984, to Huggard, discloses crystalline polyesters that are made from aromatic dicarboxylic aCids and glycols and that are foamed with an aromatic polycarbonate. There is no disclosure of high molecular weight, wholly-aromatic polyesters.

U.S. Pat. No. 4,533,702, granted Aug. 6, 1985 to Freitag, discloses a method for producing aromatic polyester carbonates having increased notched impact strength and made from solutions containing aromatic polyester and aromatic polycarbonate. This reference employs a solution polymerization process and further, it is directed towards the direct synthesis of a copolymer and towards a process for producing an aromatic polyester carbonate with improved toughness rather than towards a process for end-capping the terminal carboxyl acid groups on a polyarylate.

U.S. Pat. No. 4,436,894, granted Mar. 13, 1984, to Urasaki et. al., discloses a wholly aromatic copolyester composed mainly of isophthalic acid units and hydroquinone units, said polyester having a terminal carboxyl group concentration of not more than 90 meq/$10^6$ g There is further disclosed a process for producing a wholly aromatic copolyester having a reduced viscosity of less than about 0.6 by polycondensing in the presence of a polycondensation catalyst a mixture consisting of isophthalic acid, hydroquinone, a diaryl carbonate, and at least one other compound. This is a phenyl-ester based polymerization and the process disclosed focuses on synthesizing the polymer, not on end-capping a finished polyarylate. Further, the diaryl carbonate is used to provide the source of phenol for the phenyl-ester based polymerization and it is not used as an end-capping agent.

U.S. Pat. No. 4,137,221, granted Jan. 30, 1979, to Hara et. al., discloses a heat-curable ester group containing polymer composition prepared by reacting a linear aromatic polyester with a diaryl carbonate to depolymerize it to a low molecular weight polyester and either mixing it or partially reacting it with a monomeric or solvent-soluble polymeric compound containing at least two hydroxyl and/or secondary or primary amino groups. In this reference, the diaryl carbonate acts to depolymerize the linear aromatic polyester while in the present invention, it is used to cap the free acid ends on the polyarylate without significantly reducing molecular weight.

U.S. Pat. No. 4,680,372, granted July 14, 1987, to Rosenfeld, discloses a process for preparing an end-capped aromatic polyester by melting together a mixture of a dicarboxylic acid or diester thereof, a bisphenol and phenyl benzoate and reacting the mixture at elevated temperature. There is no disclosure of the particular end-capping agents used herein.

While it has been cited that end-capping of the terminal carboxyl groups on polyesters is well recognized as a method for improving polymer stability and that several techniques exist for the melt-capping of aliphatic polyesters or solution capping of aromatic polyesters, none of the above references disclose the particulars of the present invention with regard to capping the carboxyl acid end groups of polyarylates in the melt by use of aromatic carbonates.

SUMMARY OF THE INVENTION

This invention relates to a process for end-capping high molecular weight polyarylates and to the end-capped polyarylates having improved stability that are produced by the process. Specifically, the terminal carboxyl acid groups on a polyarylate that melts or flows at below 475° C. and that is prepared by the polymerization of at least one dihydric phenol or derivative thereof and at least one aromatic dicarboxylic acid or derivative thereof and/or at least one hydroxyaromatic acid or derivative thereof are reduced by a process comprised of melting a mixture of a polyarylate resin and an end-capping amount or a slight excess thereof, particularly 0.1–9 weight percent, of an aromatic carbonate capping agent, with the weight percent being based upon the weight of the polyarylate resin and the aromatic carbonate capping agent, and heating the mixture and, if necessary, applying vacuum until the terminal carboxyl acid group concentration of the polyarylate resin is reduced, preferably to less than 60 meq/kg. The aromatic carbonate capping agent is selected from the group consisting of diaryl carbonates, unsubstituted polyarylcarbonate oligomers, unsubstituted polyarylcarbonate polymers, substituted polyarylcarbonate oligomer, and substituted polyarylcarbonate polymers. The polyarylate can be end-capped and its flame resistance can simultaneously be improved by selecting as the capping agent a halogen substituted polyarylcarbonate oligomer, preferably a bromine substituted polyarylcarbonate oligomer, which acts also an a flame retardant. As with any flame retardant, a synergist, particularly sodium antimonate, may also be added during the end-capping step in order to enhance the flame retardancy imparted by the halogen substituted capping agent. The end-capped polyarylate resins produced by the process claimed herein have improved stability and are particularly useful where hydrolytic stability is desired. Further, these end-capped polyarylate resins also have improved stability during normal reprocessing, recycling, and reclaiming conditions.

DETAILED DESCRIPTION OF THE INVENTION

This invention relates to a process for reducing the concentration of terminal carboxyl acid groups on a high molecular weight polyarylate resin wherein the process is comprised of reacting the polyarylate resin that melts or flows below 475° C., in the melt, with an aromatic carbonate capping agent, thereby producing an end-capped polyarylate resin having a lower terminal carboxyl acid group concentration and better stability, particularly better hydrolytic stability, than the polyarylate resin prior to end-capping. More specifically, this invention relates to the novel process for end-capping the terminal carboxyl acid groups on a polyarylate resin, wherein the process is comprised of melting a mixture of a polyarylate resin and an end-capping amount, or slight excess thereof, of an aromatic carbonate capping agent and then reacting the mixture under heat and, if necessary, under vacuum until the terminal carboxyl content of the polyarylate resin is reduced, preferably to less than 60 meq/kq polyarylate resin. More preferably, it is reduced to less than 25 meq/kg polyarylate resin and most preferably, it is reduced to less than 15 meq/kg polyarylate resin. The aromatic carbonates act to end cap the terminal carboxyl acid groups on the polyarylate resin. The aromatic carbonates are preferably selected from the group consisting of diaryl carbonates, unsubstituted polyarylcarbonate oligomers, unsubstituted polyarylcarbonate polymers, substituted polyarylcarbonate oligomers, and substituted polyarylcarbonate oligomers.

The particular amount of end-capping agent to be added to the polyarylate resin should be enough to end-cap the polyarylate resin. However, a slight excess may be preferred since upon the recycling, reprocessing, and reclaiming of the end-capped polyarylate resin, more terminal carboxyl acid groups may be generated and, if there is some aromatic capping agent residue left in the end-capped polyarylate, it will scavenge for these terminal carboxyl acid groups, along with any terminal carboxyl acid groups that were left unreacted from the end-capping step, and further reduce the content of said groups. This is referred to as a "scavenging effect" and it results in a polyarylate resin that has improved stability during reprocessing, recycling, and reclaiming operations.

The amount of the aromatic carbonate capping agent that is added to the polyarylate resin in order to end-cap the resin and, where desired, provide for a slight excess, is preferably in the range of 0.1–9 weight percent, as based upon the weight of the polyarylate resin and the capping agent. When a diaryl carbonate is the capping agent of choice, the most preferred amount of capping agent is 1–3 weight percent diaryl carbonate, as based upon the weight of the polyarylate resin and the capping agent. When an unsubstituted or a substituted polyarylcarbonate polymer or oligomer is the capping agent of choice, one should preferably use enough of the capping agent to end-cap the terminal carboxyl acid ends on the polyarylate resin and, if stability during subsequent operations is desired, to have a slight excess left over. A slight excess is preferred because it can provide further increased stability to the end-capped polyarylate during subsequent operations, such as reprocessing, recycling, and reclaiming operations. The preferred amount of the unsubstituted polyarylcarbonate polymer or oligomer capping agent is 2–5 weight percent and the preferred amount of the substituted polyarylcarbonate polymer or oligomer capping agent is 4–8 weight percent, with the weight percents being based upon the weight of the polyarylate resin and the capping agent. Other various additives that are conventional to polyarylate compositions, such as, for example, tougheners and flame retardants other than those that qualify as end-capping agents herein, may also be added to the end-capped polyarylate, either during the end-capping step or after.

The polyarylates used in the compositions of the present invention are wholly aromatic polyesters that melt or flow below 475° C. and that are derived from at least one dihydric phenol or derivative thereof and at least one aromatic dicarboxylic acid and derivative thereof and/or at least one hydroxyaromatic acid or derivative thereof. Each component from which the polyarylate is derived has a functional group or groups, i.e., hydroxyl or carboxyl, attached directly to an aromatic ring.

Exemplary dihydric phenols include hydroquinone, phenylhydroquinone, t-butylhydroquinone, resorcinol, 4,4'-diphenol and 3,4'-dihydroxybenzophenone, and bisphenols as described in U.S. Pat. No. 4,187,358, which is incorporated herein by reference, as structure 1:

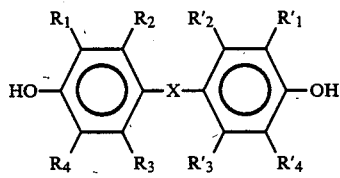

wherein —X— is selected from the group consisting of nothing, —O—, —S—, —SO$_2$—, —SO—, —CO—, an alkylene group containing 1 to 5 carbon atoms, and R$_1$, R$_2$, R$_3$, R$_4$, R$_{1'}$, R$_{2'}$, R$_{3'}$ and R$_{4'}$, which may be the same or different, each represents a member selected from the group consisting of a hydrogen atom, a chlorine atom, a bromine atom and an alkyl group containing 1 to 5 carbon atoms, and/or a functional derivative thereof. Suitable examples of alkylene groups for X containing 1 to 5 carbon atoms include a methylene group, an ethylene group, a propylene group, a tetramethylene group and a pentamethylene group. Suitable examples of alkylidene groups for X containing 2 to 7 carbon atoms include an ethylidene group, a propylidene group, an isopropylidene group, an isobutylidene group and a pentylidene group, a cyclopentylidine group and a cyclohexylidine group. Suitable examples of alkyl groups for R$_1$ to R$_4$ and R$_{1'}$ to R$_{4'}$ containing 1 to 5 carbon atoms include a methyl group, an ethyl group, an isopropyl group, a tert-butyl group and a neopentyl group.

Additionally, the dihydric phenols of the formula:

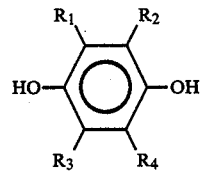

may be used alone or in combination with the bisphenols wherein R$_1$–R$_4$ are as previously described.

Examples of suitable bisphenols are 4,4'-dihydroxydiphenyl ether, bis(4-hydroxy-2-methylphenyl)ether, bis(4-hydroxy-3-chlorophenyl)ether, bis(4-hydroxyphenyl)sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, 1,1-bis(4-hydroxyphenyl)cyclohexane, 1,1-bis(4-hydroxyphenyl)cyclopentane, 1,1-bis(4-hydroxyphenyl)cycloheptane, bis(4-hydroxy-3,5-dibromophenyl)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 3,3,3',3'-tetramethyl spirobis-1,1'-indane-6,6'-diol and 1,1-bis(4-hydroxy-phenyl)-n-butane. 2,2-bis(4-hydroxyphenyl)-propane, which is bisphenol A, is most preferred.

The preferred dihydric phenols are resorcinol and bisphenol A, with the most preferred being bisphenol A.

Typical examples of the functional derivatives of the bisphenol which can be used are the alkali metal salts and diesters with aliphatic monocarboxylic acids containing 1 to 3 carbon atoms. Suitable examples of aliphatic monocarboxylic acids include formic acid, acetic acid, proprionic acid, etc. Preferred functional derivatives of the bisphenols are the sodium salts, the potassium salts, and the diacetate esters.

The bisphenol can be used either individually or as a mixture of two or more. Further, mixed salts or mixed carboxylate esters may be used.

Suitable aromatic dicarboxylic acid components include, for example, isophthalic acid, terephthalic acid, and the respective functional derivatives thereof. When the aromatic dicarboxylic acids used in preparing the polyarylate comprise a mixture of both isophthalic and terephthalic acids, and/or the functional derivatives thereof, it is preferred that the mixture be 60 to 0 mole % of terephthalic acid and/or the functional derivatives thereof and 40 to 100 mole % of isophthalic acid and/or its functional derivatives. More preferably, a mixture of 0 to 50 mole % of terephthalic acid and/or the functional derivatives thereof and 100 to 50 mole % of isophthalic acid and/or the functional derivatives thereof is used. The molar ratio of the dihydric phenol, particularly a bisphenol, to the sum of the terephthalic acid units and isophthalic acid units is substantially equimolar, e.g., about 0.95 to 1.2, preferably about 1:1, most preferably 1:1.

Examples of functional derivatives of terephthalic or isophthalic acid which can be used in this invention include acid halides and diaryl esters. Preferred examples of acid halides include terephthaloyl dichloride, isophthaloyl dichloride, terephthaloyl dibromide and isophthaloyl dibromide. Preferred examples of diaryl esters include diphenyl terephthalate and diphenyl isophthalate as well as those containing substituent groups, such as lower alkyl groups or chloro groups.

Suitable hydroxyaromatic acids include hydroxy benzoic acid or hydroxy naphthoic acid. Examples of functional derivatives of hydroxyaromatic diols include phenyl esters of hydroxyaromatic acids and acetates of hydroxyaromatic acids. Phenyl esters of hydroxyaromatic acids include phenyl 4-hydroxybenzoate and phenyl 2,6-hydroxynaphthoate.

The preferred polyarylate resin is prepared from bisphenol A and a mixture of terephthalic/isophthalic acid and it flows or melts at less than 475° C.

The polyarylate resins to be end-capped by the process of the present invention can be prepared by any of several known methods in which the end-product polyarylate has some free terminal carboxyl acid groups. The interfacial polymerization method comprises mixing a solution of an aromatic dicarboxylic acid chloride in a water-immiscible organic solvent with an alkaline aqueous solution of a dihydric phenol. The solution polymerization method comprises reacting a dihydric phenol and a diacid dichloride in an organic solvent. One preferred melt polymerization method comprises heating a diphenyl ester of an aromatic dicarboxylic acid and a dihydric phenol. Another preferred melt polymerization method comprises heating aromatic dicarboxylic acid and a diester (e.g., the diacetate ester) of a dihydric phenol. These known methods for preparing polyarylate resins are described in detail in U.S. Pat. Nos. 3,884,990, 3,946,091, 4,052,481, 4,485,230, 4,782,131 and 4,093,595, each of which is incorporated herein by reference.

In order to insure good physical properties in the compositions of the present invention, the polyarylate to be end-capped should have a logarithmic viscosity number ($\eta_{inh}$ or IV) of about 0.35 to about 10, preferably 0.40 to 5, most preferably, 0.5–4. Logarithmic viscosity is defined by the following equation:

$$\eta_{inh} = \frac{\ln t_1/t_2}{C}$$

wherein $t_1$ is the falling time (in seconds) of a solution of the polyarylate, $t_2$ is the falling time (in seconds) of the solvent; and C is the concentration (g/dl) of the polyarylate in the solution. The logarithmic viscosity number used herein is determined in a trifluoroacetic acid-methylene chloride mixture (25/75 by volume) at 30° C. The procedure is further described in Textbook of Polymer Science by F. Billmeyer, p. 79 (John Wiley & Sons, 1962).

The agents used to reduce the terminal carboxyl acid group content in the polyarylate are aromatic carbonates. Particularly, the aromatic carbonates are selected from the group consisting of diaryl carbonates, unsubstituted polyarylcarbonate polymers, unsubstituted polyarylcarbonate oligomers, substituted polyarylcarbonate polymers, and substituted polyarylcarbonate oligomers.

The diaryl carbonates used in this invention have substantially the formula

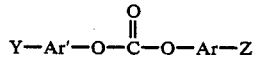

where Ar and Ar' are aromatic hydrocarbons, such as, but not limited to, phenyl, napthyl, or biphenyl. Ar may be equal to Ar'. Y and Z are single or multiple substituents with Y being limited from 1 to 5 substituents. Examples of such substituents include, but are not limited to, halogens, aliphatic groups such as methyl, ethyl, propyl, etc., heteroatoms, oxygen, nitrogen, or sulfur. Y may be equal to Z. The most preferred diaryl carbonate is where Ar=Ar'=phenyl and Y=Z=hydrogen.

The unsubstituted polyarylcarbonate polymers and oligomers used in the present invention can be designated as the linear condensation products of carbonic acid with a 4,4'-dihydroxy-diphenyl-alkane, a 4,4'-dihydroxy-triphenyl-alkane or a 4,4'-dihydroxy-diphenyl-cycloalkane in which the bridging group between the hydroxy-substituted phenyl nuclei contains at least 2 up to 9 carbon atoms which is free of aliphatic unsaturation. More particularly, the preferred unsubstituted polyarylcarbonate polymers and oligomers are those linear polymers defined by the repeating or recurring structural unit of the formula

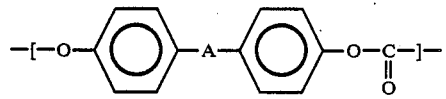

wherein A is a divalent hydrocarbon radical with a total of 2 up to about 9 carbon atoms selected from the group consisting of

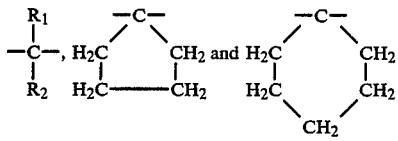

in which $R_1$ represents a member selected from the group consisting of hydrogen and lower alkyl, such as methyl, ethyl, or propyl, and $R_2$ represents a member selected from the group consisting of phenyl and alkyl of 1 to 7 carbon atoms. The desired number average molecular weight range for the unsubstituted polyarylcarbonate polymers and oligomers ranges from about 1,000–40,000.

The most preferred unsubstituted polyarylcarbonate polymer or oligomer is one that is obtained from 4,4'-dihydroxy-diphenyl-2,2-propane, more commonly referred to as bisphenol A, and illustrated by the following formula:

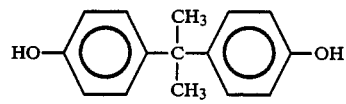

It is referred to herein as poly[2,2-propanebis(4-phenyl carbonate)] and preferably it has a number average molecular weight ranging from about 20,000–25,000.

Other suitable unsubstitued polyarylcarbonate polymers and oligomers include those derived as the carbonic acid esters of the following dihydroxy aromatic compounds:
4,4'-dihydroxy-diphenyl-1,1-ethane,
4,4'-dihydroxy-diphenyl-1,1-butane,
4,4'-dihydroxy-diphenyl-1,1-isobutane,
4,4'-dihydroxy-diphenyl-1,1-cyclopentane,
4,4'-dihydroxy-diphenyl-1,1-cyclohexane, 4,4'-dihydroxy-diphenyl-phenyl-methane,
4,4'-dihydroxy-diphenyl-2,2-butane,
4,4'-dihydroxy-diphenyl-2,2-pentane,
4,4'-dihydroxy-diphenyl-2,2-hexane,
4,4'-dihydroxy-diphenyl-2,2-isohexane,
4,4'-dihydroxy-diphenyl-2,2-heptane,
4,4'-dihydroxy-diphenyl-2,2-octane,
4,4'-dihydroxy-diphenyl-2,2-nonane,
4,4'-dihydroxy-diphenyl-ethyl-phenyl-methane,
4,4'-dihydroxy-diphenyl-3,3-pentane, and
4,4'-dihydroxy-diphenyl-4,4-heptane.

The substituted polyarylcarbonate polymeric and oligomeric capping agents of the present invention are the same as the unsubstituted polyarylcarbonate polymers and oligomers described above except that there are substituents attached to the phenyl rings of the polyarylcarbonate polymers and oligomers. As such, the preferred repeating or recurring structural unit for the substituted polyarylcarbonate capping agents is of the formula

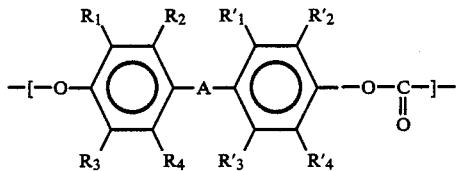

wherein —A— is the same as that described above for the unsubstituted polyarylcarbonate capping agents and $R_1$, $R_2$, $R_3$, $R_4$, $R'_1$, $R'_2$, $R'_3$, and $R'_4$, which are the substitutents and which may be the same or different, each represents a member selected from the group consisting of a hydrogen atom, a halogen atom, particularly a chlorine atom or a bromine atom, and an alkyl group containing 1 to 5 carbon atoms, and/or functional derivatives thereof. Suitable examples of alkyl groups include a methyl group, an ethyl group, an isopropyl group, a tertibutyl group, and a neopentyl group. The preferred number average molecular weight for these capping agents ranges from about 1,000–40,000. Preferred substituents are methyl groups and halogens. The more preferred substituent is bromine. The most preferred substituted polyarylcarbonate capping agent is tetrabromobisphenol A carbonate oligomer, having a formula weight of approximately 3500 and having the following formula

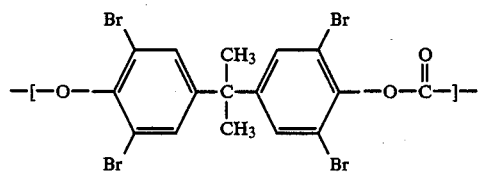

The bromine substituted capping agents are particularly preferred where decreased flammability is desired for the polyarylate resin. These agents act not only to endcap the terminal carboxyl acid groups on the polyarylate resin, but they also act as a flame retardant to reduce the flammability rating of the end-capped polyarylate resin. As with other known flame retardants, a synergist, particularly sodium antimonate, may also be added during the end-capping process to contribute to the reduction in the flammability rating. A synergistic amount of such a compound may be added. Preferably, the flame retardant end-capping agent is present in at least four times the amount of synergistic component added to the composition.

Other additives as are known to those familiar with polymer compounding may be added to the end-capped polymer either during the end-capping process or thereafter. These additives include stabilizers including phosphites, antioxidants, flame retardants other than those used herein as capping agents, synergists for flame retardants, reinforcing agents such as glass fiber and flake, minerals, tougheners, such as epoxy-containing polymers, ultraviolet light stabilizers, etc.

Process

In the end-capping process, the capping agent may be added to the polyarylate base resin after the completion of the polymerization, or finishing, process or it may be added to a previously prepared polyarylate base resin. The polyarylate to be end-capped is referred to herein as the polyarylate base resin. Preferably, the end-capping agent is added at the completion of the polyarylate base resin polymerization process. The end-capping process can be conducted in any vessel that has melting and stirring capacity, such as the original polymerization vessel or preferably, a suitable extruder having adequate hold-up time to complete the reaction.

The end-capping agent is blended and melt mixed with the polyarylate base resin. The capping agent and the polyarylate base resin are then reacted together with stirring, under conditions of heat and, if necessary, vacuum until the reaction is complete or until adequate molecular weight is reached or until the terminal carboxyl group content is sufficiently reduced. Operating temperatures should be selected consistent with obtaining a fluid melt but minimizing the thermal degradation of the composition and its components. The preferred operating temperature, based upon the temperature of the melt, is less than 475° C., most preferably it is between 280°–370° C. It is preferred that the end-capping process be conducted under vacuum since carbon dioxide is generated during the capping reaction and it can be removed through use of a vacuum. Also, in the case of capping with a diaryl carbonate, biproduct phenol is liberated. If the biproduct phenol is not removed from the melt, the molecular weight of the polyarylate resin will be lowered. Vacuum and heat provide the means by which to remove the biproduct phenol. If the molecular weight of the polyarylate resin is lowered, there will be a low molecular biproduct and it can be recovered by vacuum. On an extruder, a vacuum port can be provided at the end of the extruder, before the die extrusion. Preferably, the vacuum provided is about 10 mm Hg or less.

It may be advantageous to add a polymerization catalyst to hasten and promote reaction of the polyarylate and the capping agent. Known catalysts for ester exchange reactions, in known amounts, are particularly useful. Examples of these catalysts include alkali metal salts, alkali metal fluorides such as cesium and potassium fluorides, and those catalysts disclosed in detail in U.S. Pat. No. 4,680,372, which is incorporated herein by reference. Such a catalyst could be added along with the capping agent or, more conveniently, at the start of the polymerization process for preparing the polyarylate base resin. Other additives, such as those described above, may be added during the end-capping step or after the end-capping step. For convenience, it is preferred that such addition occur during the end-capping step.

During the end-capping procedure, and after the end-capping procedure if other additives are being added to the end-capped polyarylate composition, all components must be blended with the polyarylate base resin that is in the melt phase. By the term "melt" is meant that the polyarylate resin is a flowable liquid under processing conditions and temperatures less than 475° C. In all processing operations, it is important to dry the components of the polyarylate composition sufficiently to minimize unwanted hydrolytic degradation.

The devices suitable for the melt mixing of the components of the polyarylate compositions prepared by the process herein, during the end-capping step or after the end-capping step, include any of the polymer melt mixing devices which are known to those skilled in the art as being capable of generating sufficient heat and shear to melt and adequately mix the starting materials. These are also referred to as the primary mixing devices. For example, the components can be mixed in the original polymerization vessel, in an internal mixer such as a Brabender Mixer, in a Farrel Continuous Mixer (FCM), in a Buss Kneader, in a single screw extruder, or preferably in a twin screw extruder. It is preferable when mixing the components at high temperatures to protect them from exposure to air by using a blanket of inert atmosphere around the openings or ports of the mixing device.

Blending in a single screw extruder is accomplished by feeding a physical mixture of the components to be blended into an extruder which has been fitted with a screw that develops sufficient energy to melt and mix the components. The screw may be of a single-stage design for use in an unvented barrel or of a two-stage design for use with a vented barrel. Barrier or special mixing screws are especially preferred. The barrel temperature settings would be selected to provide the desired melt temperature and a screw speed selected within the normal operating range of the machine, usually near the upper end of the range. The product exiting the die is normally pelletized if it is to be remelted in a subsequent step.

The polyarylate compositions, both during and after end-capping, may also be compounded in a twin-screw extruder. The ZSK series machines made by the Werner & Pfleiderer Company are examples of suitable twin-screw machines. These machines employ two intermeshing co-rotating screws which are assembled from various elements into a suitable configuration. The selection of a screw configuration is not critical to the invention. A typical configuration will use conveying elements to convey the feed material from the feed zone to a melting zone in which the material is compressed and melting begins. A selection of "kneading blocks" followed by "reverse elements" next provides high shear and pressure to further the melting and mixing processes which permit the various reactions to begin. If the extrusion is to be conducted under vacuum, the reverse elements serve also to provide a melt seal following which the melt will be decompressed in the section under vacuum. Following the vacuum zone, the screw recompresses the melt and continues the dispersion process and may optionally again pass it through kneading blocks and reverse elements which, if present, also serve as a vacuum seal for this side of the vacuum zone. The melt is then further compressed and mixed as it passes through the end of the extruder and out the die. The die may be designed to form an end use shape directly, i.e., a profile, sheet or parison, or it may produce strand for pelletizing the product. In a machine such as a Baker-Perkins, the melt from the twin-screw mixer will be discharged to a single-screw extruder or other melt pump for pelletizing or shaping.

In some instances, additional mixing and/or reaction time may be desired. For example, additional time may be desired in order to insure adequate mixing and reaction of the polyarylate base resin and the capping agent and, where applicable, any other additives or it may be helpful when the viscosity of the components is high. In these instances, secondary mixing devices, such as a static mixer, may be used in addition to the primary mixing devices described above.

The polyarylate compositions, after the end-capping step, may be processed into useful objects by the many fabricating processes known to those familiar with the art of fabricating thermoplastics including direct extrusion, thermoforming, blow-molding and injection molding.

EXAMPLES

The following examples illustrate the present invention, with the testing methods and sample preparations described below.

The data for "I.V." represents logarithmic viscosity number, defined and calculated by the following equation:

$$I.V. = \frac{\ln t_1/t_2}{C}$$

wherein $t_1$ is the falling time (in seconds) of a solution of the polyarylate, $t_2$ is the falling time (in seconds) of the solvent and C is the concentration (g/dl) of the polyarylate in the solution. The logarithmic viscosity number used herein is determined in a trifluoroacetic acid-methylene chloride mixture (25/75 by volume) at 30° C. The procedure is further described in *Textbook of Polymer Science* by F. Billmeyer, p. 79 (John Wiley & Sons, 1962).

The data for "Carboxyls" represents the number of terminal carboxyl ends in the polyarylates exemplified below. It was determined by the potentiometric titration method described below. Polymer samples, 0.6 to 0.7 g, weighed to the nearest 0.0001 g, were dissolved in 50 ml of warm (100° C.) o-cresol. If the carboxyl levels were anticipated to be less than 10 meq COOH/kg, 2.0 g of polymer sample was used. When the sample was dissolved, 50 ml of o-dichlorobenzene and 5 ml of 10% lithium chloride in methanol were added and the solution was cooled to room temperature. A blank control (B) was treated similarly. The sample was titrated with 0.03 normal potassium hydroxide in ethanol. A Brinkman Metrohm 636 Titro processor was used with a Brinkman/Metrohm E635 Dosimat and 10 ml burette as auxiliary equipment. A Metrohm model combination EA120 combination glass/calomel electrode was used with the standard aqueous potassium chloride filling replaced by ethanolic lithium chloride. Carboxyl end group concentration was calculated as follows:

$$C = [(A-B)*N*1000]/S$$

wherein C is the number of terminal carboxyl groups (meq/kg), A is the amount of the sample titer (ml), B is the amount of the blank titer (ml), N is the normality of the potassium hydroxide solution, S is the sample weight (g), and 1000 has units of g/kg. The term "Starting Carboxyls" indicates the terminal carboxyl acid group content of the base resin prior to end-capping while the term "Final Carboxyls" indicates said content after end-capping.

All reported weight percents in the examples are based upon total composition weight.

EXAMPLES 1–9

End-capping of Polyarylate via Batch Process With a Diphenyl Carbonate Capping Agent In Examples 1–9, polyarylate was finished in the presence and absence of catalyst, both with and without a diphenyl carbonate capping agent. The data for these examples are listed below in Table I. "Total Polymerization Time" in Table I, below, represents the difference in time from when the polyarylate prepolymer was charged into the polymerization vessel to when the polymerization reaction was completed, if no end-capping agent was used, or to when the end-capping reaction was complete, if such an end-capping agent was used.

Specifically, in Examples 1–9, polyarylate prepolymer was prepared by charging, under nitrogen, a stirred autoclave, at 213° C., with 382 lbs of bisphenol A, 278 lbs of isophthalic acid, and 376 lbs of acetic anhydride. After charging was complete, the pot temperature was 138° C. The mixture was stirred and gradually heated over 5 hours to a temperature of 305° C., during which time 382 lbs of distillate was collected. The residue is polyarylate prepolymer. It was next emptied into trays under an atmosphere of nitrogen, cooled, and then flaked for subsequent finishing use.

The polyarylate base resin was prepared by polymerizing, or finishing, the polyarylate prepolymer in a three necked, round bottomed flask fitted with a glass paddle stirrer, a short path distillation head, and a vacuum/nitrogen purging system. The flask was heated with a Woods metal bath and temperatures recorded were bath temperatures. This flask was charged with 110 g of the polyarylate prepolymer and, in some examples, it was charged with a catalyst (Examples 5–9). It was next evacuated to 1 torr and purged with nitrogen three times. The flask was then immersed in the bath at 200° C. and stirred at atmospheric pressure, under nitrogen, and heated to 300° C. over approximately 30 minutes. Over the next approximately 30 minutes, the pressure was dropped to less than 1 torr and stirring was conducted until the mass was too viscous to stir, which usually occurred when the polymer wrapped itself around the stirrer shaft. Uncapped polymerization controls (Examples 1, 2, 5, and 6) were terminated at this point by the removal of heat and vacuum. This was the polyarylate base resin.

The polyarylate base resin was end-capped (Examples 3, 4, 7, 8, and 9) by pressurizing the flask to atmospheric pressure with nitrogen and adding 3.15 g of diphenyl carbonate to the flask. The pressure was then reduced over approximately 30 minutes with stirring and heating until the polymer again reached a highly viscous stage.

The data in Table I shows that despite the varying total polymerization times, the samples in Examples 1–9 all had similar molecular weights, as evidenced by the similar inherent viscosity values. It is evident from comparing examples 1 and 2 with examples 3 and 4 that the terminal carboxyl group content of the polyarylate base resin is drastically reduced when diphenyl carbonate is added to the polyarylate base resin. Examples 5, 6, and 7 showed that similar results were achieved, in a shorter polymerization time, when a catalyst such as sodium acetate, was employed. Examples 8 and 9 again show a drastic reduction in the terminal carboxyl group content of the polyarylate base resin when diphenyl carbonate is used.

TABLE I

End-Capping of Polyarylate via Batch Process with Diphenyl Carbonate Capping Agent

| Example No. | Weight Diphenyl Carbonate | ppm Catalyst | Total Polym. Time (hrs) | I.V. | Carboxyls (meq/kg) |
|---|---|---|---|---|---|
| 1 | — | — | 2.25 | 0.43 | 18 |
| 2 | — | — | 2.53 | 0.48 | 15 |
| 3 | 3 | — | 4.28 | 0.40 | 1 |
| 4 | 3 | — | 4.43 | 0.42 | 1 |
| 5 | — | 68 Na acetate | 1.65 | 0.39 | 36 |
| 6 | — | 68 Na acetate | 2.30 | 0.44 | 23 |
| 7 | 3 | 68 Na acetate | 2.03 | 0.46 | 12 |
| 8 | 3 | 115 Na phosphate | 5.63 | 0.47 | 0 |
| 9 | 3 | 83 K phosphate | 4.80 | 0.43 | 0 |

EXAMPLES 10–20

End-Capping of Polyarylate via Extrusion with an Unsubstituted Polyarylcarbonate Polymer In Examples 10–20, the terminal carboxyl groups on the polyarylate base resin, which was prepared both with and without catalyst, were end-capped via an extrusion process using an unsubstituted polyarylcarbonate polymer as the capping agent. The results are listed below in Table IIB. "Starting I.V." is the I.V. of the polyarylate base resin prior to extrusion. "Final I.V." is the I.V. of the polyarylate base resin after extrusion, if no capping agent was added, or if the end-capping agent was added, it is the I.V. of the polyarylate after the end-capping step and after extrusion.

Three polyarylate base resins were tested in Examples 10–20. The base resins differed from each other in that they were from different batches. Each was prepared from a polyarylate prepolymer. The prepolymer was made from the same reactants, and in a similiar manner, as was the prepolymer of Examples 1–9. The polyarylate prepolymer was polymerized, or finished, in order to make the base polyarylate resin, in a manner similar to that described for Examples 1–9, above, except that the finishing vessel was of a much larger capacity. The polyarylate base resin was then formed into pellets for subsequent use.

The end-capping agent used in examples 10–20 was an unsubstituted polyarylcarbonate polymer. Specifically, it was poly(2,2-propanebis (4-phenyl carbonate)), which is a polyarylcarbonate prepared from bisphenol A, and it had a number average molecular weight range of 20,000–25,000.

The unsubstituted polyarylcarbonate polymer capping agent and the polyarylate base resin were mixed as a blend of pellets, well-dried, and then fed under a nitrogen atmosphere through a 28 mm twin screw Werner & Pfleiderer extruder. The screw speed, barrel settings, melt temperature, and rate used in each example is listed below in Table IIA. In some examples, a static mixing section, particularly a Kenics Static Mixer ®, was added to the end of the extruder in order to increase the average residence time of the polymer in the extruder to about 5 minutes at the particular extrusion rate. Further, in some examples, there was added a vacuum port at the fourth the extrusion zone in order to assure that the polymer would not degrade due to the influence of air and moisture. In all examples, the polymer was quenched as a strand and cut and dried as is normally done for this procedure.

The results in Table IIB show that where the unsubstituted polyarylcarbonate polymer was added to the polyarylate base resin, the terminal carboxyl group content of the polyarylate base resin was reduced. Table IIB further shows that improved results were obtained when both a static mixing section and a vacuum were used (for e.g., compare Examples 12 and 13 to Examples 14 and 15, respectively). However, the terminal carboxyl group content of the polyarylate was still reduced without using both devices (see Examples 12 and 13). Table IIB also shows that results improved as more capping agent was added (see examples 14 and 15 or examples 17 and 18).

EXAMPLES 21-23

Hydrolytic and Reprocessing Stability of the End-capped Polyarylate

Examples 21-22 illustrate that improved hydrolytic stability and improved reprocessing stability are obtained when the terminal carboxyl acid end groups on the polyarylate base resin are reduced by the process herein.

A polyarylate base resin, prepared from a bisphenol A isophthalate and in a manner similar to that described for the base resin of Examples 10-20, above, was compounded/end-capped in an extruder with 5% and 8%, respectively, of poly(2,2-propanebis (4-phenyl carbonate)) having a number average molecular weight range of 20,000-25,000. The extrusion conditions during the compounding/end-capping procedure were similar to those described for examples 17-20, above. The polyarylate base resin (Example 21) and the compounded resins (Examples 22-23) were re-processed by injection molding on a conventional 6 ounce molding machine by conventional methods into standard ⅛′ thick tensile bars. Injection molding is an example of a typical re-processing procedure to which a polyarylate may be subjected. The bars for each of these resins were immersed in boiling distilled water for 7 and 14 days.

Table III below summarizes the polyarylate carboxyl ends after compounding/end-capping (labelled "resin") and after molding (labelled "molded"). The percent tensile strength retained after aging for 7 and 14 days is also summarized. The results show that when the carboxyl end group content was reduced, tensile strength was retained to a much greater extent than when the carboxyl group content was not reduced. The results further show that, upon reprocessing, i.e., injection molding, the terminal carboxyl group content of the base polyarylate resin, with no capping agent present, was increased. In contrast, when the polyarylcarbonate end-capping agent was present, the terminal carboxyl group content on the end-capped polyarylate resin was decreased even further upon reprocessing. These results are illustrative of the "scavenging effect" disclosed above. Specifically, it shows that if the end-capped polyarylate was subjected to re-processing, any residual end-capping agent that was present in the end-capped

TABLE IIIA

Extrusion Conditions for End-Capping Polyarylate with an Unsubstituted Polyarylcarbonate Polymer

| Example No. | Screw Design | Other | Screw Speed (rpm) | Temp. Set Barrel 1 & 2 (°C.) | Temp. Set Barrel 3-5 (°C.) | Melt Temp (°C.) | Rate (lb/hr) |
| --- | --- | --- | --- | --- | --- | --- | --- |
| 10 | c/3 | Kenics | 180 | 285/300 | 300 | 327 | 9.0 |
| 11 | c/3 | Vac | 180 | 285/300 | 300 | 351 | n/a |
| 12 | c/4 | Vac | 180 | 285/295 | 295 | 353 | 13.0 |
| 13 | c/4 | Vac | 180 | 285/295 | 295 | 350 | 12.0 |
| 14 | c/3 | Vac/Kenics | 180 | 285/295 | 295 | 323 | 7.8 |
| 15 | c/3 | Vac/Kenics | 180 | 285/295 | 295 | 325 | 9.0 |
| 16 | c/3 | Kenics | 180 | 285/300 | 300 | 330 | 9.5 |
| 17 | c/3 | Vac/Kenics | 180 | 285/295 | 295 | 325 | 6.9 |
| 18 | c/3 | Vac/Kenics | 180 | 285/295 | 295 | 327 | 4.5 |
| 19 | c/3 | Vac/Kenics | 180 | 290/300 | 300 | 343 | 9.0 |
| 20 | c/3 | Vac/Kenics | 180 | 290/300 | 300 | 350 | 12.3 |

Legend
Screw Design c/3 = one 036-305/405(K);one 061-024/016(R);followed by two 036-305/015(K);one 061-024/008(R)
Screw Design c/4 = two 031-045/045/125(F);two 031-045/045;031-030/060;031-030/010;031-024/008;037-305/045(K);061-024/016(R);two 031-045/045;031-024/024;two 036-305/015(K);061-024/008;031-024/024;three 031-045/045;031-030/060;031-030/030;031-024/008;031-024/048;TIP
Vac = vacuum
Kenics = Kenics Static Mixer (static mixing section)

TABLE IIB

End-Capping of Polyarylate with an Unsubstituted Polyarylcarbonate (PC) Polymer via Extrusion

| Example No. | PAr | wt % PC | Starting IV | Final IV | Carboxyls (meq/kg) Starting | Final |
| --- | --- | --- | --- | --- | --- | --- |
| 10 | A | — | 0.49 | 0.47 | 84 | 72 |
| 11 | A | — | 0.49 | 0.44 | 84 | 94 |
| 12 | A | 2 | 0.49 | 0.49 | 84 | 78 |
| 13 | A | 5 | 0.49 | 0.48 | 84 | 58 |
| 14 | A | 2 | 0.49 | 0.49 | 84 | 59 |
| 15 | A | 5 | 0.49 | 0.48 | 84 | 21 |
| 16* | B | — | 0.49 | 0.46 | 110 | 88 |
| 17* | B | 2 | 0.49 | 0.53 | 110 | 25 |
| 18* | B | 5 | 0.49 | 0.49 | 110 | 1 |
| 19* | B | 5 | 0.49 | 0.50 | 110 | 1 |
| 20 | C | 5 | 0.49 | 0.47 | 49 | 7 |

Legend
PAr = polyarylate base resin; each base resin was prepared from the same components (described above) but each letter represents a different batch
PC = unsubstituted polyarylcarbonate polymer (described above)
* = contains approximately 20 ppm sodium acetate catalyst polyarylate would continue to act as a capping agent, scavenging for terminal carboxyl acid groups that were left after the end-capping step and/or that were generated during the re-processing procedure.

TABLE III

Hydrolytic Stability of Polyarylate with

| Example No. | % Capping Agent | Carboxyl Ends (meg/kg) Resin | Carboxyl Ends (meg/kg) Molded | % Tensile Strength Retained 7 Days | % Tensile Strength Retained 14 days |
|---|---|---|---|---|---|
| 21 | 0 | 75 | 80 | 13.6 | 0 |
| 22 | 5 | 24 | 14 | 97.0 | 23.5 |
| 23 | 8 | 7 | 0 | 105.9 | 106.9 |

EXAMPLES 24–25.

End-capping Polyarylate with a Bromine Substituted Polyarylcarbonate Oligomer to Achieve Improved Flame Retardancy In Example 25, the terminal carboxyl acid group content of the base polyarylate resin was reduced by using a brominated polyarylcarbonate oligomer capping agent and the flame retardancy of the base resin was improved through use of the brominated capping agent, along with a known synergist.

Specifically, a polyarylate base resin having an I.V. of 0.55 and prepared from bisphenol A isophthalate under conditions similar to those described for the base resin in Examples 10–20, above, was blended with 6.0 weight percent tetrabromobisphenol A carbonate oligomer having a formula weight of 3537 and a bromine content of 58.7%, 1.57 weight percent sodium antimonate concentrate containing 20% polyethylene binder, and conventional antioxidants consisting of 0.1% 1,3,5-trimethyl-2,4,6-tris[3,5-di-tert-butyl-4-hydroxybenzyl]-benzene and 0.05% N,N-hexamethylene bis(3,5-di-tert-butyl-4-hydroxyhydrocinnanamide). The blend was compounded in a conventional 28 mm Werner & Pfleiderer twin screw extruder without any special mixing devices. The uncompounded polyarylate base resin (Example 24) and the compounded/end-capped blend (Example 25) were then injection molded in a conventional 6 ounce molding machine into standard 1/16" flex bars by conventional methods. The bars were then subjected to the vertical UL94 flammability test by standard procedures.

Table IV below summarizes the compounding conditions, the terminal carboxyl ends of the polyarylate base resin before (Example 24) and after (Example 25) compounding/end-capping, and the UL94 test results for the polyarylate base resin and the compounded/end-capped resin. The results show that the brominated polyarylcarbonate capping agent acted effectively in reducing the terminal carboxyl group content of the base polyarylate resin. Further, the results show that improved flame retardancy was achieved for the polyarylate base resin through use of the brominated capping agent and a sodium antimonate synergist.

TABLE IV

End-Capping Polyarylate with a Brominated Polyarylcarbonate Oligomer, along with Improving the Flame Retardancy of the Polyarylate

| | Extrusion Conditions | | | | | |
|---|---|---|---|---|---|---|
| Example No. | Screw (rpm) | Rate (lb/hr) | Temperature (°C.) Zone Set | Temperature (°C.) Melt | Carboxyls (meg/kg) | UL94 rating |
| 24 | — | — | — | — | 76 | V-2 |

TABLE IV-continued

End-Capping Polyarylate with a Brominated Polyarylcarbonate Oligomer, along with Improving the Flame Retardancy of the Polyarylate

| | Extrusion Conditions | | | | | |
|---|---|---|---|---|---|---|
| Example No. | Screw (rpm) | Rate (lb/hr) | Temperature (°C.) Zone Set | Temperature (°C.) Melt | Carboxyls (meg/kg) | UL94 rating |
| 25 | 200 | 9.6 | 300 | 354 | 10 | V-0 |

EXAMPLES 26–27

End-Capping of Polyarylate with a Substituted Polyarylcarbonate Oligomer

In examples 26–27, polyarylate was end-capped with a bromine substituted polyarylcarbonate oligomer and it was simultaneously blended with a known toughener, specifically, an epoxy functional polymer. The results are listed below in Table VB.

For these examples, the polyarylate base resin was made from bisphenol A and isophthalic acid under conditions similar to those described for the base resin of Examples 10–20, above. This polyarylate base resin had an I.V. of 0.55 and the terminal carboxyl group content was 76 meq/kg polyarylate resin.

In Example 26, the polyarylate base resin was mixed with 7.2% of an epoxy-containing polymer, which was an ethylene/n-butyl acrylate/glycidyl methacrylate (73.6/25.0/1.4 wt %, respectively) terpolymer, 1.57% of a sodium antimonate concentrate containing 20% polyethylene binder, and 6% tetrabromobisphenol A carbonate oligomer as the end-capping agent. In Example 27, 8% tetrabromobisphenol A carbonate oligomer was used instead of 6%. The epoxy-containing polymer is a known toughener for polymer resin and the sodium antimonate is a synergist for providing flame retardancy. The tetrabromobisphenol A carbonate oligomer had a formula weight of 3537 and a bromine content of 58.7%. In both examples, the components were mixed together as a pellet blend, well dried, and fed under a dry nitrogen atmosphere to a 28 mm Werner and Pfliederer extruder. The extrusion conditions are described in Table VA. No additional mixing devices were used. All zones in the extruder were set at a temperature of 300° C. The melt temperatures were measured at the die exit. The extrudate was quenched as a strand and cut and dried.

The results in Table VB show that the terminal carboxyl group content of the base polyarylate resin was drastically reduced with use of the substituted polyarylcarbonate oligomer capping agent. Results were also improved as the amount of capping agent used was increased. These examples also illustrated that other additives, such as a toughener, may be blended during the end-capping process with the polyarylate base resin.

TABLE VA

Extrusion Conditions for End-Capping Polyarylate with a Bromine Substituted Polyarylcarbonate Oligomer

| Example No. | Screw Speed (rpm) | Zone Setting (°C.) | Melt Temp. (°C.) | Rate (lb/hr) |
|---|---|---|---|---|
| 26 | 200 | 300 | 356 | 10.2 |
| 27 | 200 | 300 | 354 | 10.6 |

TABLE VB

End-Capping of Polyarylate with Bromine Substituted Polyarylcarbonate Oligomer via Extrusion

| Example No. | Wt. % Capping Agent | Carboxyls (meq/kg) Starting | Carboxyls (meq/kg) Final |
|---|---|---|---|
| 26 | 6 | 76 | 19 |
| 27 | 8 | 76 | 4 |

We claim:

1. A process for reducing the terminal carboxyl acid group concentration of a polyarylate resin which comprises melting a mixture of the polyarylate resin with from an end-capping amount to a slight excess thereof of an aromatic carbonate capping agent selected from the group consisting of diphenyl carbonates, unsubstituted polyarylcarbonate oligomers, unsubstituted polyarylcarbonate polymers, substituted polyarylcarbonate oligomers, and substituted polyarylcarbonate polymers, and reacting the mixture under heat to produce an end-capped polyarylate resin having a terminal carboxyl acid group concentration that is less than that of the polyarylate resin.

2. The process according to claim 1 wherein the mixture is also reacted under a vacuum of less than about 10 mm Hg.

3. The process according to claim 1 wherein the range of from an end-capping amount to a slight excess thereof of the aromatic carbonate capping agent is 0.1-9 weight percent, as based upon the weight of the capping agent and the polyarylate resin.

4. The process according to claim 1 wherein the aromatic carbonate capping agent is a diaryl carbonate.

5. The process according to claim 4 wherein, the diaryl carbonate capping agent is diphenyl carbonate.

6. The process according to claim 4 wherein the amount of the aromatic carbonate capping agent is 1-3 weight percent, based upon the weight of the capping agent and the polyarylate resin.

7. The process according to claim 1 wherein the aromatic carbonate capping agent is an unsubstituted polyarylcarbonate oligomer.

8. The process according to claim 1 wherein the aromatic carbonate capping agent is an unsubstituted polyarylcarbonate polymer.

9. The process according to claim 7 or 8 wherein the amount of the aromatic carbonate capping agent is 2-5 weight percent, as based upon the weight of the capping agent and the polyarylate resin.

10. The process according to claim 8 wherein the unsubstituted polyarylcarbonate capping agent is poly[2,2-propanebis(4-phenyl carbonate)] having a number average molecular weight range of 20,000–25,000.

11. The process according to claim 1 wherein the aromatic carbonate capping agent is a substituted polyarylcarbonate polymer.

12. The process according to claim 1 wherein the aromatic carbonate capping agent is a substituted polyarylcarbonate oligomer.

13. The process according to claim 11 or 12 wherein the amount of the aromatic carbonate capping agent is 4–8 weight percent, as based upon the weight of the capping agent and the polyarylate resin.

14. The process according to claim 12 wherein the substituted polyarylcarbonate oligomer is a halogen substituted bisphenol A carbonate oligomer.

15. The process according to claim 14 wherein the halogen substituted polyarylcarbonate oligomer is tetrabromobisphenol A carbonate oligomer having a formula weight of about 3500.

16. The process according to claim 15 wherein there is added, along with the tetrabromobisphenol A carbonate oligomer, a sodium antimonate synergist.

17. The process according to claim 1 wherein the terminal carboxyl acid group concentration of the end-capped polyarylate resin is less than 60 meq/kg resin.

18. The process according to claim 17 wherein the terminal carboxyl acid group concentration is less than 25 meq/kg resin.

19. The process according to claim 18 wherein the terminal carboxyl acid group concentration is less than 15 meq/kg resin.

20. A polyarylate composition having a reduced concentration of terminal carboxyl acid end groups comprised of a polyarylate resin, the ends of which consist essentially of groups formed from reaction, in the melt, of the terminal carboxyl acid groups on the polyarylate resin with 4–8 weight percent of a halogenated polyarylcarbonate oligomer, wherein the weight percent is based upon the weight of the polyarylate resin and the polyarylcarbonate oligomer.

21. The polyarylate composition of claim 20 wherein the concentration of terminal carboxyl acid end groups is less than 25 meq/kg.

22. The polyarylate composition of claim 20 wherein the halogenated polyarylcarbonate oligomer is tetrabromobisphenol A carbonate oligomer.

23. The polyarylate composition of claim 20 further comprised of a synergistic amount of sodium antimonate.

* * * * *